No. 878,023.  
PATENTED FEB. 4, 1908.  
R. ROST.  
MIXING VALVE.  
APPLICATION FILED MAY 20, 1907.
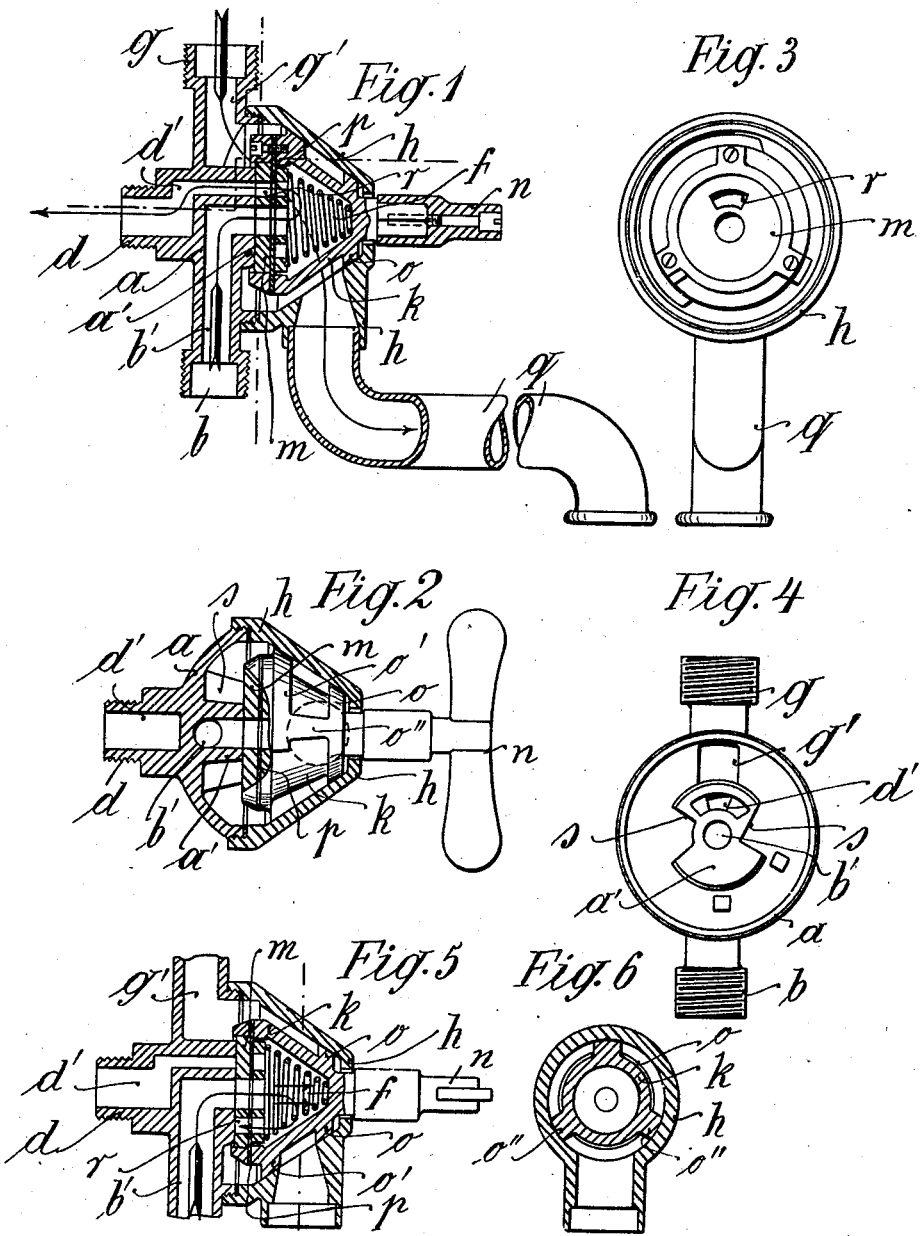

UNITED STATES PATENT OFFICE.

RICHARD ROST, OF LEIPZIG, GERMANY.

MIXING-VALVE.

No. 878,023.

Specification of Letters Patent.

Patented Feb. 4, 1908.

Application filed May 20, 1907. Serial No. 374,792.

*To all whom it may concern:*

Be it known that RICHARD ROST, a subject of the Emperor of Germany, residing at 12 Eberhardtstrasse, Leipzig, Germany, has invented certain new and useful Improvements in Mixing-Valves; and he does hereby declare the following to be a full, clear, and exact description of the invention, such as will enable others skilled in the art to which it appertains to make and use the same.

This invention relates to a mixing-valve for baths and similar purposes which, like similar already known mixing valves is so constructed that with a single handle it is possible to turn on cold water, warm water—that is water from the supply pipe mixed with hot water, or hot water only—as may be required. A disadvantage in these one handle mixing valves as at present constructed is that they allow of a sudden closing of the water supply pipe, so that water hammering occurs in the pipe resulting in leakages and other damage. In order to obviate these defects the new mixing valve is so constructed that when opened it can only be gradually closed and in consequence of this the velocity of the water passing through is slowly checked. This is effected by resiliently connecting with the rotary valve seated in the valve casing, a conical part which, when the passage for the water is closed, is pressed under the increasing pressure thus produced against a cap on the valve casing which covers it and is likewise conical, and thus produces a brake action, which offers a suitable resistance to the sudden closing.

The mixing valve is illustrated in the accompanying drawing in various positions.

Figure 1 is a longitudinal section of the mixing valve in the open position, Fig. 2 is a sectional plan of Fig. 1; Fig. 3 a view of the interior of the valve cap with the rotary valve; Fig. 4 a view of the interior of the valve casing with the cap removed; Fig. 5 a view of the interior of the closed mixing valve and Fig. 6 a transverse section of Fig. 5.

The valve casing $a$ is furnished in the usual manner with three junctions $b\ d\ g$ of which $b$ is connected with the cold water supply pipe, $d$ with pipe leading to a water heating apparatus and junction $g$ with the hot water supply pipe coming from the water heating apparatus.

The passages $b'$ and $d'$ open into the interior of a disk shaped extension $a'$ of the valve casing $a$ forming the valve seating, whereas the passage $g'$ above the extension $a'$ opens into the casing $a$. The front part of the casing is covered by a conical cap $h$, in which a cone $k$ moves with the rotary valve $m$. Outside the cap $h$ the cone $k$ is connected with the handle $n$. Near the apex of the cone an annular rib $o$ is provided and another rib is provided near the base, for example the rib $o'$ that extends around half the circumference of the cone, and which is so connected with the rib $o$ by means of transverse ribs $o''$ (Figs. 2 and 6) that a closed cell is formed inside the cap $h$ by the ribs $o''$, $o'$ and $o$, the remaining part however being entirely open, that is in communication with the opening $g'$ of the inlet $g$ and in connection with the rotary valve, when the shutting off device is in the suitable position. The rotary slide valve $m$ is flexibly connected, for example by means of an india-rubber disk $p$, with the cone $k$ and is pressed against its seat $a'$ by a spring $f$ inserted in the cone. The outlet nozzle $q$ for the water is connected with the cap $h$.

The action of the mixing valve described above is as follows: When the opening $r$ in the rotary valve $m$ takes the position in relation to the seating shown in Figs. 1 and 3, the supply water flowing through $b'$ enters the hollow space in the cone $k$, continues its course through the opening $r$ in the rotary valve to the passage $d'$ and reaches the apparatus for heating the water placed lower down, then flows upwards through the passage $g'$ into the valve casing and to the part left open through the ribs $o'$ and $o''$ between the bell $h$ and the cone $k$, where it is delivered through the outlet $q$ (Fig. 1). The valve seat $a'$ is furnished with recesses $s$ on both sides of the opening of $d'$ and the opening $d'$ is widened inside the seat $a'$ in such a manner that when the passage $r$ in the rotary valve $m$ lies partially over one of the recesses $s$ and the opening $d'$, the mixing of cold and warm water takes place. The lower surface of the seat $a'$ (Fig. 4) corresponds to the closing position of the mixing valve, so that when the valve is opened, under all circumstances that is to say no matter in what direction the valve $m$ is rotated, first cold water, subsequently mixed, that is warm water is brought into use and hot water only as the valve is further rotated. This characteristic it is true exists in other mixing valves. A novel feature in the present invention however is the flexible connection of a cone $k$ with the rotary valve $m$, as thereby a disadvantage is obviated that exists in nearly all known mixing valves of the kind, viz., that of allowing a sudden shutting off and thereby causing severe shocks in the water supply pipe, which often lead to pipe fractures and similar defects. In consequence of the flexible connection of the rotary slide $m$ with the cone $k$, the closing of the valve can only be effected slowly, because in proportion as the passage is narrowed, the water flowing in the pipe is checked, the pressure between the cone $k$ and the rotary valve $m$ increases and in this way through the friction of the cone $k$ in the cap $h$ such a braking effect is produced that the complete closing of the passage can only be effected slowly.

What he claims and desires to secure by Letters Patent is:—

1. A mixing valve for cold and warm water, comprising a rotary cone, a disk-valve, and a flexible connection between said cone and valve, whereby the closing motion of the valve is retarded.

2. A mixing valve for cold and warm water, embracing a rotary cone, a disk valve, and a flexible connection between said cone and valve, the port of said disk valve moving successively from closed position over one of two recesses in the valve-seat and hot-water opening.

3. A mixing valve for cold and warm water, embracing a rotary cone, a disk-valve, and a flexible connection between said cone and valve, said cone having only a part of its widened circumference in engagement with the inclosing cap of said cone, for controlling the opening and closing of the hot-water opening, as the valve is actuated.

In testimony whereof I affix my signature, in presence of two witnesses.

RICHARD ROST.

Witnesses:
HERM. SACK,
RUDOLPH FRICKE.